US007642459B2

(12) United States Patent
Motoda

(10) Patent No.: US 7,642,459 B2
(45) Date of Patent: Jan. 5, 2010

(54) COVER UNIT FOR FUEL TANK

(75) Inventor: Haruaki Motoda, Gunma (JP)

(73) Assignee: Hitachi, Ltd., Tokyo (JP)

( * ) Notice: Subject to any disclaimer, the term of this patent is extended or adjusted under 35 U.S.C. 154(b) by 693 days.

(21) Appl. No.: 11/210,696

(22) Filed: Aug. 25, 2005

(65) Prior Publication Data

US 2006/0081395 A1 Apr. 20, 2006

(30) Foreign Application Priority Data

Oct. 8, 2004 (JP) ............................. 2004-296237

(51) Int. Cl.
*H02G 3/04* (2006.01)

(52) U.S. Cl. ...................... 174/66; 174/67; 174/17 VA; 220/241; 220/242; 220/562

(58) Field of Classification Search ................... 174/66, 174/67, 50, 53, 57, 58, 151, 88 R, 650, 17 R, 174/17 VA, 520, 135; 220/3.2–3.9, 4.02, 220/241, 242, 366.1, 367.1, 562; 439/535, 439/536, 550, 565, 544, 722, 939; 123/214, 123/519

See application file for complete search history.

(56) References Cited

U.S. PATENT DOCUMENTS 5,762,049 A * 6/1998 Jones et al. ................. 123/514
6,075,204 A * 6/2000 Celauro et al. .......... 174/17 VA
6,182,693 B1 * 2/2001 Stack et al. ................. 123/519
6,332,555 B1 * 12/2001 Stangier ..................... 220/562
6,367,650 B1 * 4/2002 Kuehnemund et al. ...... 220/562
6,821,162 B2 * 11/2004 Mott et al. .................. 439/722
6,890,190 B1 * 5/2005 Jurcak et al. ................ 439/939
7,228,847 B2 * 6/2007 Burke et al. ................ 220/562
7,268,301 B2 * 9/2007 Hosoya ....................... 174/151

FOREIGN PATENT DOCUMENTS

JP 8177668 B2 7/1996

* cited by examiner

*Primary Examiner*—Angel R Estrada
(74) *Attorney, Agent, or Firm*—Antonelli, Terry, Stout & Kraus, LLP.

(57) ABSTRACT

In a cover unit for a fuel tank, a cover section is attached to the fuel tank to cover an opening of the fuel tank; an electronic-circuit containing section contains an electronic circuit; and an electric conductor is attached to penetrate the cover section and is adapted to electrically connect the electronic circuit with an electrical equipment within the fuel tank. Moreover, a vapor passage is formed between the cover section and the electronic-circuit containing section, and is adapted to discharge fuel exuded from a gap between the cover section and the electric conductor, to outside of the fuel tank in a vapor state.

33 Claims, 7 Drawing Sheets

COVER UNIT FOR FUEL TANK

BACKGROUND OF THE INVENTION a) Field of the Invention

The present invention relates to a cover unit for a fuel tank. Specifically, the present invention relates to a cover unit for a fuel tank, which includes an electronic circuit for an electrical equipment.

b) Description of the Related Art

Various kinds of cover units for fuel tanks have been previously proposed. A Japanese Patent No. 3371409 issued on Nov. 22, 2002 exemplifies a previously proposed cover unit for a fuel tank.

In the cover unit for the fuel tank disclosed in this Japanese Patent, a recess portion is formed in an upper surface of a cover which is attached so as to cover and close an opening of the fuel tank. A control circuit for controlling a fuel pump installed within the fuel tank is disposed in the recess portion.

SUMMARY OF THE INVENTION

In the cover unit disclosed in the above-described Japanese Patent, however there is a possibility that fuel exudes from a gap between the cover itself and a connector or harness penetrating the cover, and enters into the recess portion; when internal pressure within the fuel tank has increased. Hence, there is a possibility that this entry of fuel becomes a cause of inappropriate operation such as a malfunction in the control circuit.

It is, therefore, an object of the present invention to provide a cover unit for a fuel tank, which is capable of suppressing the inappropriate effect due to the exuded fuel.

According to one aspect of the present invention, there is provided a cover unit for a fuel tank, comprising: a cover section attached to the fuel tank to cover an opening of the fuel tank; an electronic-circuit containing section that contains an electronic circuit; an electric conductor attached to penetrate the cover section, and adapted to electrically connect the electronic circuit with an electrical equipment within the fuel tank; and a vapor passage formed between the cover section and the electronic-circuit containing section, and adapted to discharge fuel exuded from a gap between the cover section and the electric conductor, to outside of the fuel tank in a vapor state.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention. In embodiments according to the present invention, a cover unit for a fuel tank, which is installed on the fuel tank for a vehicle equipped with an internal combustion engine is exemplified.

Figure 1:
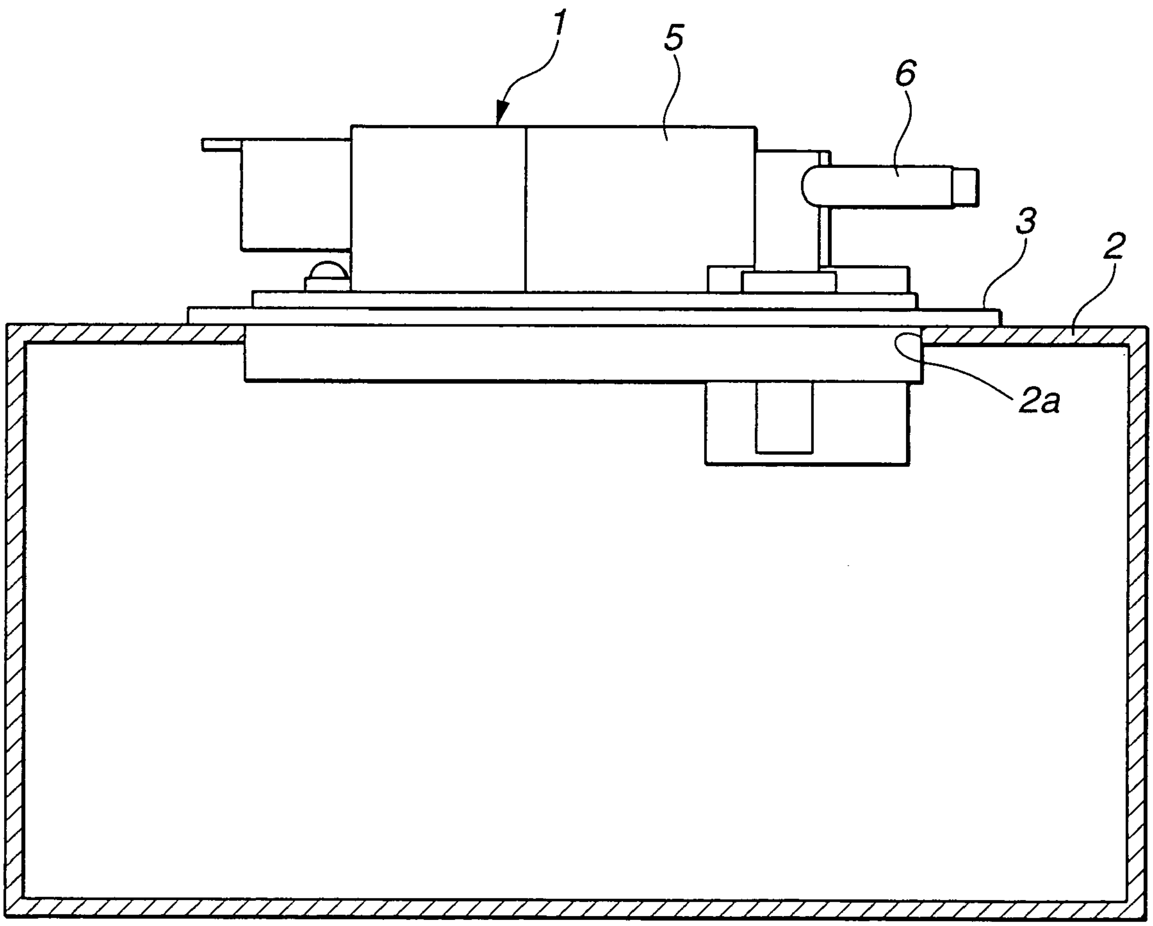
FIG. 1 is a side view showing the state where a cover unit for a fuel tank, according to the present invention is mounted on the fuel tank.
Figure 2:
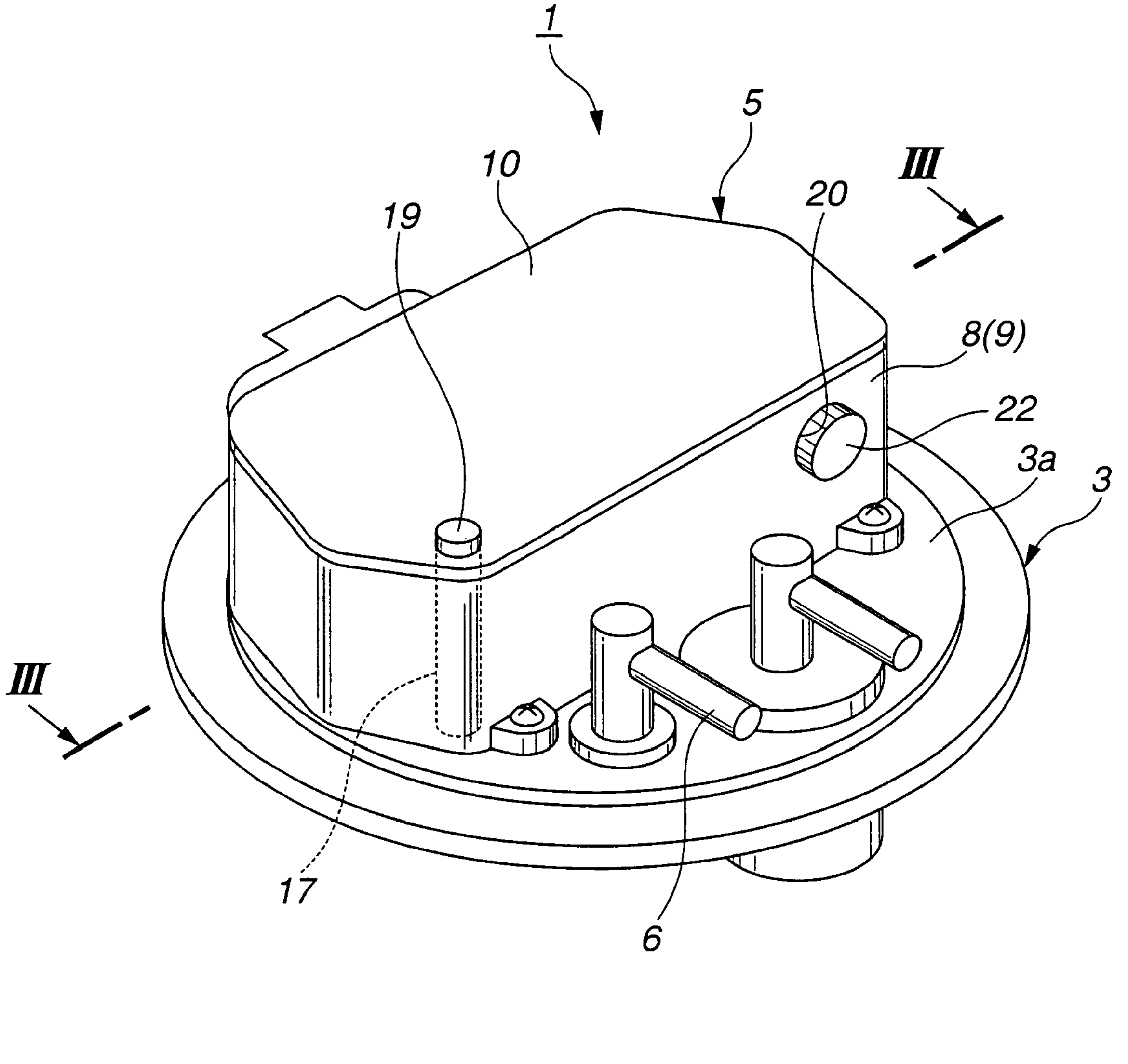
FIG. 2 is an angular view of a cover unit for a fuel tank in a first embodiment according to the present invention.
Figure 3:
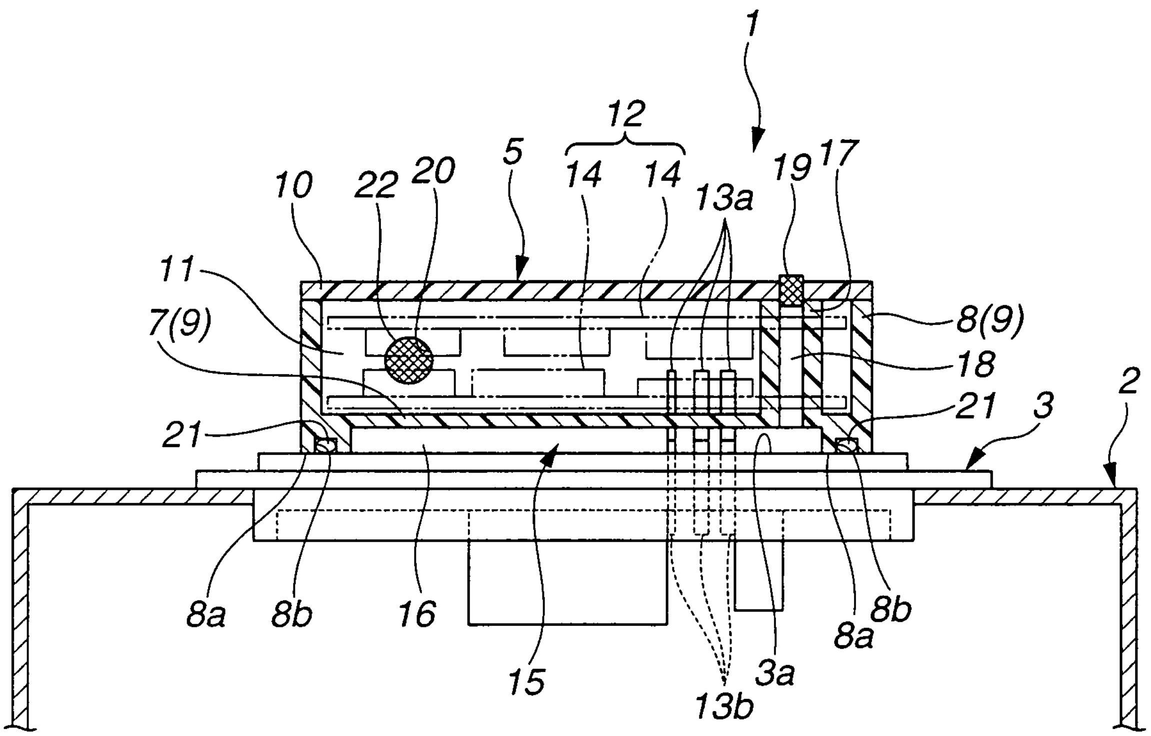
FIG. 3 is a sectional view of the cover unit for the fuel tank in the first embodiment, taken along a sectional line III-III of FIG. 2.

FIGS. 1~3 largely show a first embodiment according to the present invention. FIG. 1 is a side view of a fuel tank on which a cover unit for the fuel tank according to the first embodiment is mounted. FIG. 2 is an angular view of the cover unit for the fuel tank, according to the first embodiment. Moreover, FIG. 3 is a sectional view of the cover unit for the fuel tank, taken along a sectional line III-III of FIG. 2.

The cover unit 1 for the fuel tank is attached so as to cover and close an opening 2*a* provided in an upper (top) wall of the fuel tank 2. The cover unit 1 includes a cover section 3 which is substantially in the shape of a disc and is attached to fuel tank 2 to cover opening 2*a;* and an electronic-circuit containing section 5 which is substantially in the shape of a box and is attached on an upper surface 3*a* of cover section 3. Cover section 3 includes a feed pipe 6 to supply (or, feed) fuel discharged from a fuel pump (not shown) installed within fuel tank 2, to an internal combustion engine (not shown).

Electronic-circuit containing section 5 includes a main body section 9 which has a bottom wall 7 and a side wall 8; and an upper cover 10 which covers and closes an upper opening of main body section 9. Electronic-circuit containing section 5 contains (encloses) an electronic circuit (or, electric circuit) 12 within a containment chamber 11 enclosed by bottom wall 7, side wall 8, and upper cover 10. In addition, this electronic-circuit containing section 5 is formed as a part separated from cover section 3, and is coupled with cover section 3, on upper surface 3*a* of cover section 3, e.g., by screws.

Electronic circuit 12 is electrically connected with an electrical equipment(s) within fuel tank 2, such as the fuel pump or a liquid-level sensor, through, e.g., a busbar (not shown) or terminals 13*a* and 13*b* as an electric conductor. Namely, the electric conductor is attached so as to electrically connect electronic circuit 12 with the electrical equipment within fuel tank 2. Electronic circuit 12 functions as, e.g., a control circuit or a sensing circuit for these electrical equipments. In this embodiment, electronic circuit 12 includes two electronic circuit boards 14. These electronic circuit boards 14 are disposed within containment chamber 11 vertically in two levels, so as to allow component mounting surfaces of electronic circuit boards 14 to face to each other. Namely, electronic circuit boards 14 are arranged within containment chamber 11, in such a position that component mounting surfaces thereof face to each other.

Bottom wall 7 is provided vertically apart from a bottom surface 8*a* of side wall 8. Bottom surface 8*a* also corresponds to a bottom surface of electronic-circuit containing section 5. Bottom wall 7 is shaped like, so-called, a push-up bottom. Namely, a recess portion 15 is formed in bottom surface 8*a* which allows electronic-circuit containing section 5 to abut on cover section 3. In other words, electronic-circuit containing section 5 has recess portion 15 in its bottom surface 8*a.* Then, in a condition that electronic-circuit containing section 5 has been mounted on cover section 3, recess portion 15 is covered with upper surface 3*a* of cover section 3. Namely, upper surface 3*a* covers or closes recess portion 15. Thereby, a bottom chamber 16 is formed (defined) between cover section 3 and electronic-circuit containing section 5.

Moreover, an annular groove section 8*b* is formed all around, in bottom surface 8*a* of side wall 8. Namely, bottom surface 8*a* of side wall 8 has annular groove section 8*b* in a loop. Air-tightness and liquid-tightness of bottom chamber 16 are secured by an O-ring 21 attached in annular groove section 8*b*. O-ring 21 corresponds to a sealing member of this embodiment, which seals bottom chamber 16.

Electronic-circuit containing section 5 includes a communicating tube 17 extending vertically (relative to FIG. 3). Bottom chamber 16 communicates with outside of fuel tank 2 (i.e., the outside of cover unit 1 and fuel tank 2) through a passage 18 inside this communicating tube 17, with bottom chamber 16 isolated from containment chamber 11. Namely, communicating tube 17 extends vertically from bottom chamber 16 to outside of fuel tank 2. In addition, a gas transmitting section 19 which conducts (transmits) gas and does not conduct liquid, is attached at an outlet 17*a* of communicating tube 17. For example, a gas-permeable membrane or a water-repellent porous material such as Gore-Tex which is a registered trade-mark, adheres to (is attached at) outlet 17*a* as gas transmitting section 19.

Terminal 13*a* as the electric conductor is formed so as to be inserted through bottom wall 7 of electronic-circuit containing section 5. Terminal 13*a* penetrates front and back surfaces of bottom wall 7. Namely, a lower end of terminal 13*a* is exposed under a lower surface of bottom wall 7 (i.e., within bottom chamber 16), and an upper end of terminal 13*a* is exposed within containment chamber 11. In other words, the lower end of terminal 13*a* protrudes below the lower surface of bottom wall 7, and the upper end of terminal 13*a* protrudes above an upper surface of bottom wall 7. On the other hand, terminal 13*b* is formed so as to be inserted through cover section 3. Terminal 13*b* penetrates front and back surfaces of cover section 3. Namely, a lower end of terminal 13*b* is exposed within fuel tank 2, and an upper end of terminal 13*b* is exposed above upper surface 3*a* of cover section 3 (i.e., within bottom chamber 16). In other words, the lower end of terminal 13*b* protrudes below a lower surface of cover section 3, and the upper end of terminal 13*b* protrudes above upper surface 3*a* of cover section 3. When electronic-circuit containing section 5 is mounted at a predetermined position on cover section 3, these terminals 13*a* and 13*b* are fit into or engaged with each other by gender fitting, and thereby electrically connected with each other. Thus, a conductive passageway which links terminal 13*a* exposed inside electronic-circuit containing section 5 to terminal 13*b* exposed within fuel tank 2, is formed.

Side wall 8 includes a communicating through-hole 20 which allows the inside and outside of containment chamber 11 to communicate with each other. Namely, communicating through-hole 20 is formed through side wall 8 of electronic-circuit containing section 5. Thereby, containment chamber 11 is adapted to have substantially same pressure as the outside of fuel tank 2 (also, outside of cover unit 1), i.e., atmospheric pressure. By such a configuration, heat generated by electronic circuit 12 can escape through communicating through-hole 20. Hence, there is the advantage that a possibility for producing inappropriate effect (e.g., malfunction) due to temperature increase within containment chamber 11 can be suppressed. In addition, a gas transmitting section 22 which functions in a similar manner as gas transmitting section 19, is attached to communicating through-hole 20. This gas transmitting section 22 prevents a liquid such as water from entering (intruding) into containment chamber 11 from the outside.

In cover unit 1 having the above-described configuration, liquid or vapor (gas) of the fuel within fuel tank 2 can possibly exude or seep through the gap between cover section 3 and terminal 13*b*, when the (internal) pressure within fuel tank 2 has increased.

In this embodiment, terminal 13*b* is exposed within bottom chamber 16, and the gap between cover section 3 and terminal 13*b* communicates (is connected) with bottom chamber 16. Hence, the exuded fuel is prevented from intruding into containment chamber 11. Moreover, bottom chamber 16 communicates (is connected) with outside of fuel tank 2 through passage 18 inside this communicating tube 17. Hence, even if fuel exudes in a liquid state, the exuded fuel evaporates inside bottom chamber 16 and is discharged (or exhausted) to the outside of fuel tank 2 through passage 18. Namely, in this embodiment, the above-described bottom chamber 16 and (passage 18 inside) communicating tube 17 are formed as a vapor passage (path) for discharging the fuel exuded through the gap between cover section 3 and terminal 13*b*, to outside of fuel tank 2 in a vapor state. Hence, the exudation of fuel into containment chamber 11 can be avoided, and the electronic circuit also can be prevented from producing inappropriate behavior (e.g., its defective condition).

Moreover, in this embodiment, electronic-circuit containing section 5 is formed in the shape of a box, as a member different from cover section 3. Recess portion 15 is formed in at least one of bottom surface 8*a* of electronic-circuit containing section 5 and upper surface 3*a* of cover section 3 (in the above-described configuration, only in bottom surface 8*a* of electronic-circuit containing section 5). Then, bottom chamber 16 is defined by recess portion 15, under the condition where electronic-circuit containing section 5 has been attached on cover section 3. Since this recess portion 15, i.e., bottom chamber 16 is used as the vapor passage, the vapor passage can be formed remarkably easily.

Furthermore, in this embodiment, air-tightness and liquid-tightness of bottom chamber 16 are kept at the contact surface between cover section 3 and containing section 5. On the other hand, there is provided passage 18 which extends upward from bottom chamber 16 and communicates with the outside of fuel tank 2. Hence, the exuded fuel can not leak in liquid state, and can be evaporated (vaporized) more certainly and then discharged to outside of fuel tank 2. Moreover, since bottom chamber 16 is arranged in contact with (adjacent to) upper surface 3*a* of cover section 3, there is also an advantage that the exuded fuel is easy to evaporate because of heat received from fuel tank 2.

Furthermore, in this embodiment, passage 18 is provided with gas transmitting section 19 which passes gas but not liquid. Hence, liquid such as water can not intrude into bottom chamber 16 or passage 18 from the outside of fuel tank 2, and thereby the liquid such as water can be prevented from inhibiting evaporation of the exuded fuel.

Figure 4:
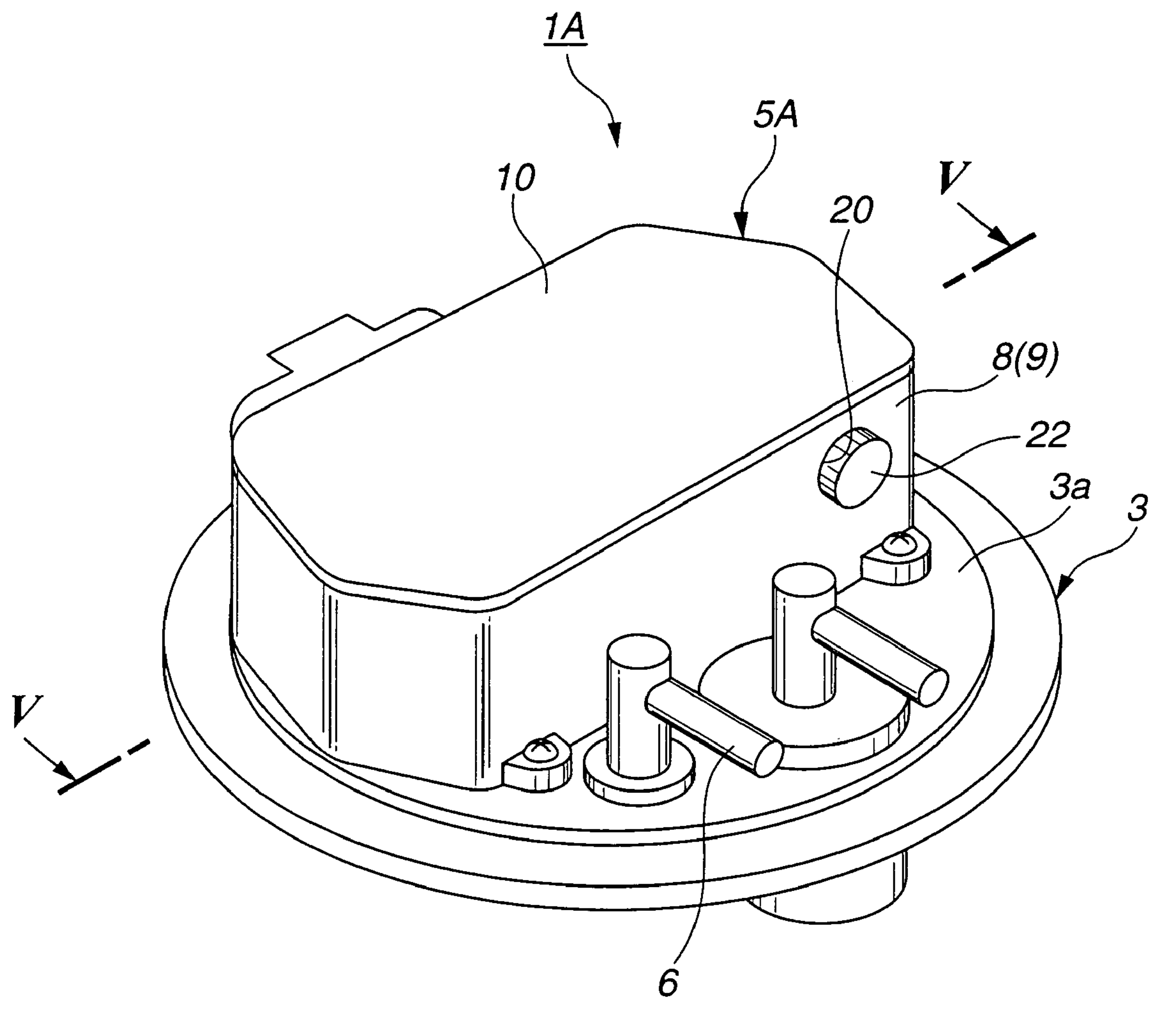
FIG. 4 is an angular view of a cover unit for a fuel tank in a second embodiment according to the present invention.
Figure 5:
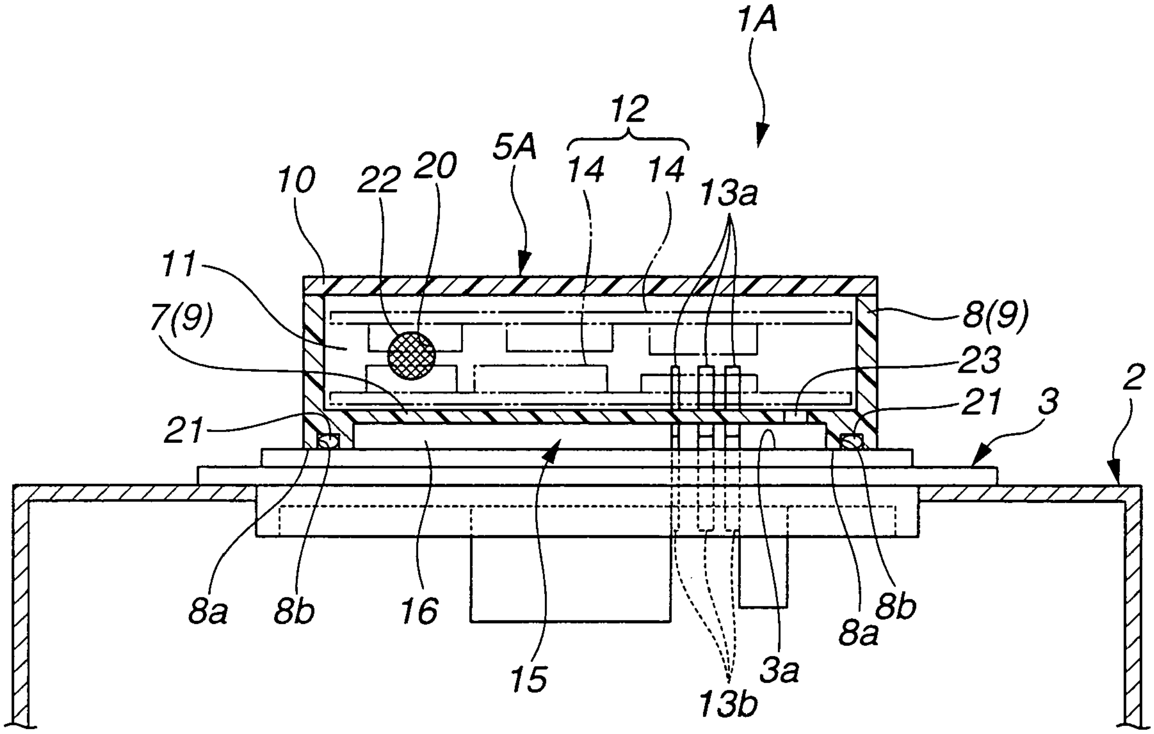
FIG. 5 is a sectional view of the cover unit for the fuel tank in the second embodiment, taken along a sectional line V-V of FIG. 4.

FIGS. 4 and 5 largely show a second embodiment according to the present invention. FIG. 4 is an angular view of a cover unit for the fuel tank, according to the second embodiment. FIG. 5 is a sectional view of the cover unit for the fuel tank, taken along a sectional line V-V of FIG. 4. The cover unit 1A according to this second embodiment also includes same elements as the above-described cover unit 1 according to the first embodiment. Hereinafter, these elements will have the same reference numerals or signs as the first embodiment, and the detailed explanation about these elements will be omitted from the following description in the second embodiment.

In cover unit 1A for the fuel tank in this second embodiment, a communicating through-hole 23 is formed in bottom wall 7 of containment chamber 11 as a substitute for communicating tube 17 of the first embodiment. In other words, bottom wall 7 of containment chamber 11 in the second embodiment includes communicating through-hole 23 taking the place of communicating tube 17 of the first embodiment. Communicating through-hole 23 is formed to allow bottom chamber 16 to communicate with containment chamber 11 inside electronic-circuit containing section 5. Hence, the fuel exuded into bottom chamber 16 is discharged to the outside of fuel tank 2 (i.e., outside of cover unit 1A and fuel tank 2) through communicating through-hole 23, containment chamber 11, and communicating through-hole 20. Therefore in this case, the vapor passage is composed of bottom chamber 16, communicating through-hole 23, containment chamber 11, and communicating through-hole 20. In addition, since the exuded fuel is evaporated within bottom chamber 16, the exuded fuel does not affect electronic circuit 12. In this embodiment, effects and advantages similar to those in the first embodiment are obtained. Moreover, simpler configuration can be achieved in this embodiment since communicating tube 17 is not provided. Hence, this embodiment also has cost advantage.

Figure 6:
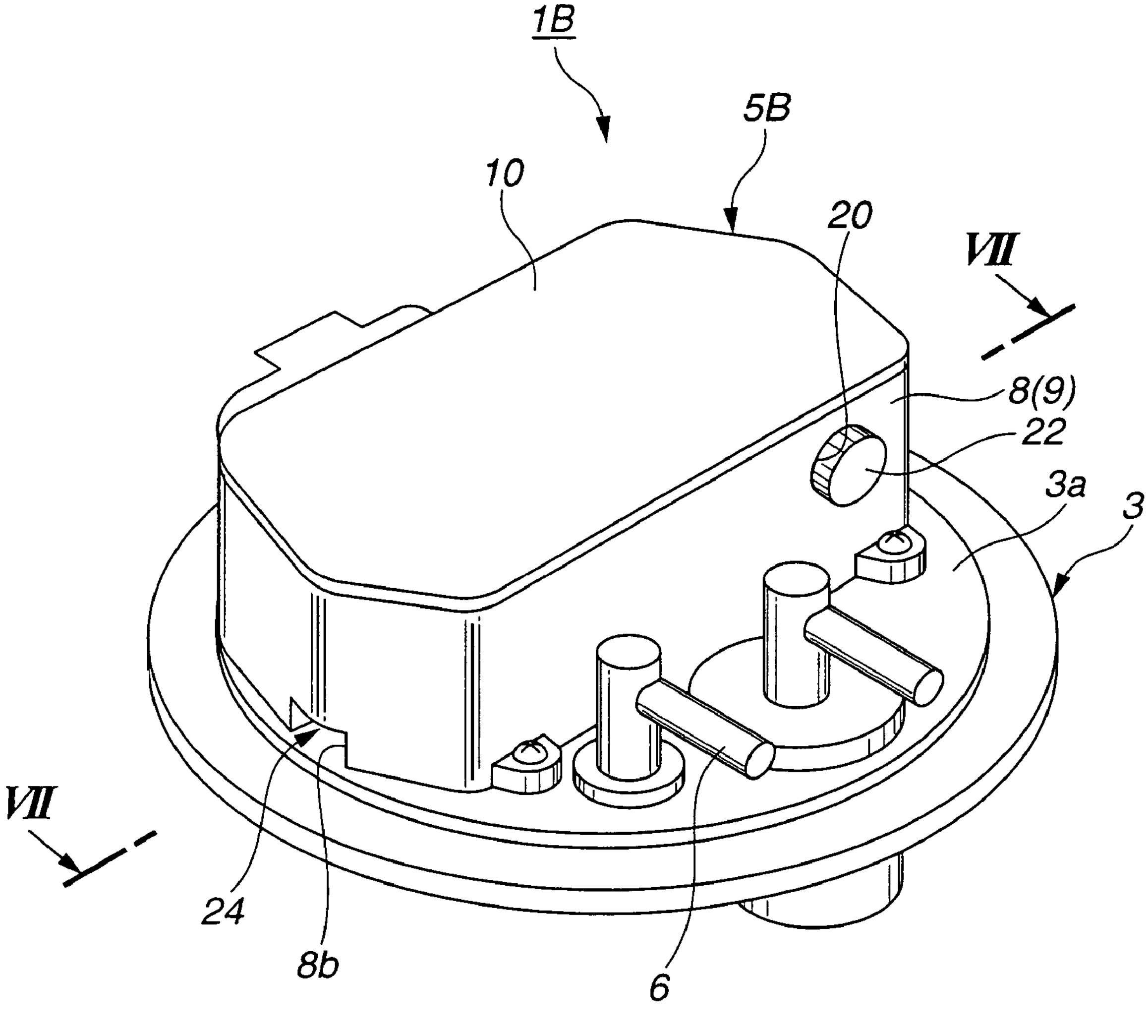
FIG. 6 is an angular view of a cover unit for a fuel tank in a third embodiment according to the present invention.
Figure 7:
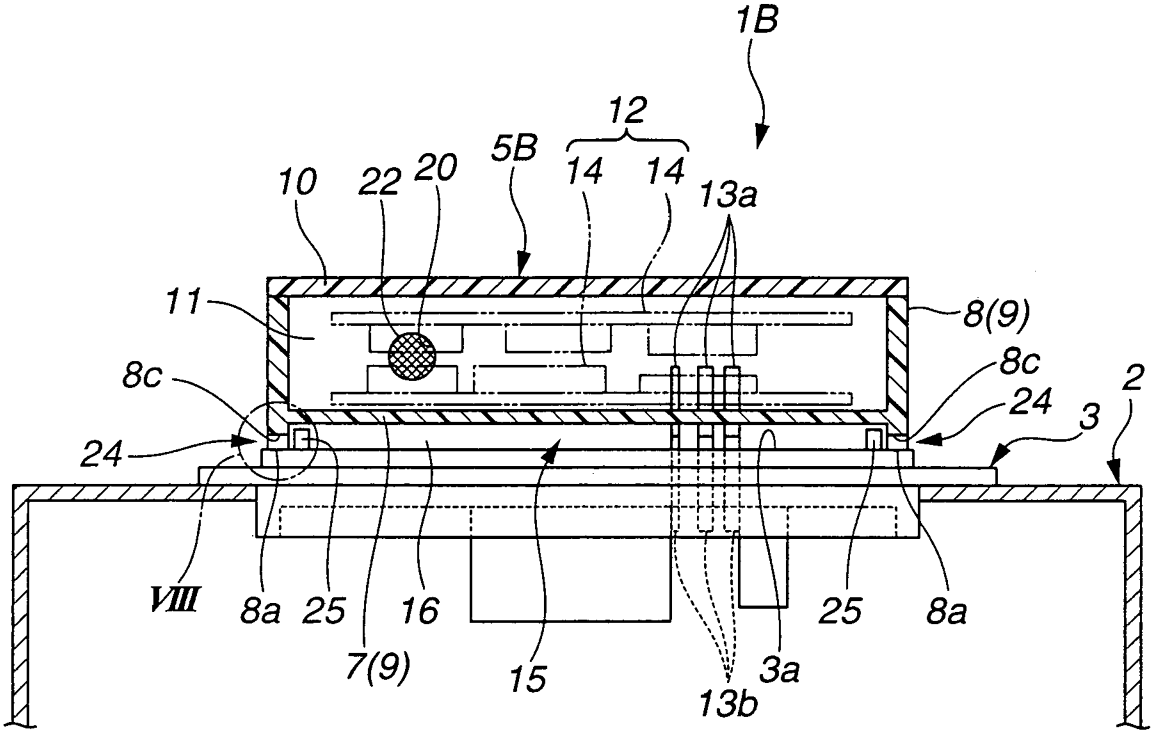
FIG. 7 is a sectional view of the cover unit for the fuel tank in the third embodiment, taken along a sectional line VII-VII of FIG. 6.
Figure 8:
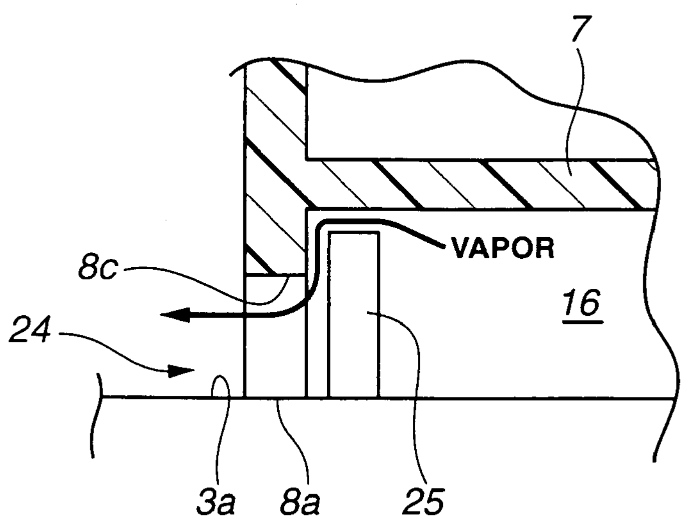
FIG. 8 is an enlarged sectional view of a region VIII of FIG. 7.

FIGS. 6 through 8 largely show a third embodiment according to the present invention. FIG. 6 is an angular view of a cover unit for the fuel tank, according to the third embodiment. FIG. 7 is a sectional view of the cover unit for the fuel tank, taken along a sectional line VII-VII of FIG. 6. FIG. 8 is an enlarged view of a region VIII of FIG. 7. The cover unit 1B according to this third embodiment also includes same elements as the above-described cover unit 1 according to the first embodiment. Hereinafter, these elements will have the same reference numerals or signs as the first embodiment, and the detailed explanation about these elements will be omitted from the following description of the third embodiment.

Cover unit 1B for the fuel tank in this third embodiment is configured to allow evaporative fuel (i.e., vapor of the exuded fuel) within bottom chamber 16 to be discharged to the outside through a communicating through-hole 24 formed at a boundary portion between electronic-circuit containing section 5B and cover section 3. Namely in this case, the vapor passage is composed of bottom chamber 16 and communicating through-hole 24. More concretely, communicating through-hole 24 is defined as a part which is surrounded by upper surface 3*a* of cover section 3 and a notch 8*c* provided (formed) in bottom surface 8*a* of side wall 8 of electronic-circuit containing section 5B. In other words, bottom surface 8*a* of side wall 8 has communicating through-hole 24 defined by upper surface 3*a* and notch 8*c*. Moreover in this embodiment, two communicating through-holes 24 are provided at two side wall 8's points opposed to each other. Thus, communicating through-hole(s) 24 is formed in the side wall 8's portion corresponding to a side wall of bottom chamber 16.

Furthermore in this embodiment, a shielding wall 25 is provided (formed) in a protruding manner, on upper surface 3*a* of cover section 3, and at a bottom chamber 16's portion adjacent to communicating through-hole 24. Namely, this shielding wall 25 protrudes from upper surface 3*a* of cover section 3, at the position displaced from an inner surface of side wall 8 by a slight (very narrow) gap. In such a configuration, the vapor is discharged through communicating through-hole 24, by following a detour defined by shielding wall 25. Namely, the vapor within bottom chamber 16 passes above shielding wall 25, and is exhausted from communicating through-hole 24. On the other hand, the fuel in liquid state can not leak to the outside of fuel tank 2 and cover unit 1B, since the fuel in liquid state is dammed up by shielding wall 25. Namely, shielding wall 25 stops the flow of the liquid-state fuel between bottom chamber 16 and the outside of fuel tank 2. Moreover, a liquid such as water from the outside is also dammed up by shielding wall 25, thereby cannot enter into bottom chamber 16. In addition, it is favorable that this shielding wall 25 is installed in an all-around loop, along the inner surface of side wall 8. Thereby, liquid-tightness can be secured in all-around of the inner surface of side wall 8. In this embodiment, effects and advantages similar to those in the above-described first embodiment can be obtained.

The following other embodiments according to the present invention can also be achieved. The following other embodiments also can obtain effects and advantages similar to those in the above-described embodiments.

(1) In the above-described first, second and third embodiments, the recess portion is provided (formed) in the bottom surface of the electronic-circuit containing section. However, this recess portion may be provided in the surface of the cover section.

(2) Moreover, this recess portion may be provided in both of the bottom surface of the electronic-circuit containing section and the upper surface of the cover section.

(3) Furthermore, the electronic-circuit containing section may be placed apart from the upper surface of the cover section, by installing an annular spacer between the bottom surface of the electronic-circuit containing section and the upper surface of the cover section. Namely, the bottom chamber may be formed as a region surrounded by an inner wall surface of this spacer, the bottom surface of the electronic-circuit containing section, and the upper surface of the cover section. Also in this other embodiment (3), the sealing member such as O-ring can be attached between the bottom surface of the electronic-circuit containing section and the upper surface of the cover section (i.e., between the annular spacer and respective the bottom surface of the electronic-circuit containing section and the upper surface of the cover section), to seal the bottom chamber. Moreover, in this other embodiment (3), a through-hole corresponding to communicating through-hole 24 of the above-described third embodiment can be formed in the annular spacer, to allow the bottom chamber to communicate with outside of the fuel tank; and the shielding wall can also be formed to stop the flow of liquid between the bottom chamber and the outside of the fuel tank.

In addition, it is noted that the other configurations of these additional embodiments (1), (2) and (3) can be achieved in the similar manner as the above-described first, second and third embodiments.

Here, some configurations and advantages with reference to the above-described embodiments (first, second and third embodiments, and additional embodiments (1), (2) and (3)) according to the present invention will now be described.

(a) In the cover unit according to the present invention, the electronic-circuit containing section includes the communicating tube, which extends vertically to outside of the fuel tank from the bottom chamber defined by the recess portion between the cover section and the electronic-circuit containing section. Hence, the vapor passage is defined by the bottom chamber and the passage inside this communicating tube, and is isolated from the containment chamber of the electronic-circuit containing section. In other words, the bottom chamber and the passage extending vertically from the bottom chamber to outside of the fuel tank are provided so as to be isolated from the containment chamber of the electronic-circuit containing section, as the vapor passage. Thereby, the fuel exuded into the bottom chamber is discharged from this passage in a vapor state.

In such a favorable configuration, the exuded fuel can be more surely evaporated, even if the exuded fuel is in a liquid state within the bottom chamber. Then the evaporative fuel can be discharged outside the fuel tank. Thus, the exuded fuel can be more certainly prevented, from entering into the containment chamber of the electronic-circuit containing section and thereby giving adverse effects (e.g., malfunction) to the electronic circuit.

(b) In the cover unit according to the present invention, the sealing member is attached between the bottom surface of the electronic-circuit containing section and an upper surface of the cover section, to seal the bottom chamber. In other words, the sealing member such as O-ring is provided to seal between the bottom surface of the electronic-circuit containing section and an upper surface of the cover section.

In such a favorable configuration, the fuel exuded into the vapor passage (bottom chamber) can be prevented from leaking from the boundary between the electronic-circuit containing section and the cover section.

(c) In the cover unit according to the present invention, the electronic-circuit containing section includes the first through-hole to allow the bottom chamber to communicate with the containment chamber inside the electronic-circuit containing section. The electronic-circuit containing section further includes the second through-hole to allow the containment chamber to communicate with outside of the fuel tank. Thereby, the bottom chamber, the first through-hole, and the second through-hole are defined as the vapor passage.

In such a favorable configuration, the containment chamber itself is also used as the vapor passage. Hence, the vapor passage can be formed (secured) in simpler configuration.

(d) In the cover unit according to the present invention, the through-hole is formed in the side wall of the bottom chamber, to allow the bottom chamber to communicate with outside of the fuel tank. Moreover, the shielding wall is formed to stop a flow of liquid between the bottom chamber and outside of the fuel tank. Thereby, the bottom chamber and the through-hole are defined as the vapor passage.

In such a favorable configuration, the vapor passage can be configured relatively easily. Moreover, leakage of the liquid-state fuel can be avoided, and entry of the liquid such as water from the outside into the bottom chamber, can be suppressed by the shielding wall.

(e) In the cover unit according to the present invention, the electronic-circuit containing section contains a plurality of electronic circuit boards, in the position to allow component mounting surfaces of the respective two electronic circuit boards to face to each other.

In such a favorable configuration, the relatively large electronic circuit (i.e., relatively large-scale circuit) can be contained within the electronic-circuit containing section, more easily and in more compact form.

This application is based on a prior Japanese Patent Application No. 2004-296237 filed on Oct. 8, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A cover unit for a fuel tank, comprising:

a cover section attached to the fuel tank to cover an opening of the fuel tank;

an electronic-circuit containing section that contains an electronic circuit;

an electric conductor attached to penetrate the cover section, and adapted to electrically connect the electronic circuit with an electrical equipment within the fuel tank; and a vapor passage formed between the cover section and the electronic-circuit containing section, and adapted to discharge fuel exuded from a gap between the cover section and the electric conductor, to outside of the fuel tank in a vapor state;

wherein the electronic-circuit containing section is formed in the shape of a box, as a member different from the cover section; and a recess portion is formed in at least one of a bottom surface of the electronic-circuit containing section and an upper surface of the cover section; and the vapor passage is defined by the recess portion under the condition where the electronic-circuit containing section is mounted on the cover section.

2. The cover unit as claimed in claim 1, wherein the electronic-circuit containing section includes a communicating tube extending vertically to outside of the fuel tank from a bottom chamber defined by the recess portion between the cover section and the electronic-circuit containing section; and the vapor passage is defined by the bottom chamber and a passage inside the communicating tube and is isolated from a containment chamber of the electronic-circuit containing section.

3. The cover unit as claimed in claim 2, wherein a gas transmitting section to transmit gas and not to transmit liquid is attached in the vapor passage.

4. The cover unit as claimed in claim 2, wherein a sealing member is attached between the bottom surface of the electronic-circuit containing section and an upper surface of the cover section, to seal the bottom chamber.

5. The cover unit as claimed in claim 3, wherein the electronic-circuit containing section contains a plurality of electronic circuit boards, to allow component mounting surfaces of the respective two electronic circuit boards to face to each other.

6. The cover unit as claimed in claim 4, wherein the electronic-circuit containing section contains a plurality of electronic circuit boards, to allow component mounting surfaces of the respective two electronic circuit boards to face to each other.

7. The cover unit as claimed in claim 1, wherein the electronic-circuit containing section includes a first through-hole to allow a bottom chamber defined by the recess portion between the cover section and the electronic-circuit containing section, to communicate with a containment chamber inside the electronic-circuit containing section; and the electronic-circuit containing section further includes a second through-hole to allow the containment chamber to communicate with outside of the fuel tank, and wherein the vapor passage is defined by the bottom chamber, the first through-hole, and the second through-hole.

8. The cover unit as claimed in claim 7, wherein a gas transmitting section to transmit gas and not to transmit liquid is attached in the vapor passage.

9. The cover unit as claimed in claim 7, wherein a sealing member is attached between the bottom surface of the electronic-circuit containing section and an upper surface of the cover section, to seal the bottom chamber.

10. The cover unit as claimed in claim 8, wherein the electronic-circuit containing section contains a plurality of electronic circuit boards, to allow component mounting surfaces of the respective two electronic circuit boards to face to each other.

11. The cover unit as claimed in claim 9, wherein the electronic-circuit containing section contains a plurality of electronic circuit boards, to allow component mounting surfaces of the respective two electronic circuit boards to face to each other.

12. The cover unit as claimed in claim 1, wherein a through-hole is formed in a side wall of a bottom chamber defined by the recess portion between the cover section and the electronic-circuit containing section, to allow the bottom chamber to communicate with outside of the fuel tank; and a shielding wall is formed to stop a flow of liquid between the bottom chamber and outside of the fuel tank, and wherein the vapor passage is defined by the bottom chamber and the through-hole.

13. The cover unit as claimed in claim 12, wherein a gas transmitting section to transmit gas and not to transmit liquid is attached in the vapor passage.

14. The cover unit as claimed in claim 12, wherein a sealing member is attached between the bottom surface of the electronic-circuit containing section and an upper surface of the cover section, to seal the bottom chamber

15. The cover unit as claimed in claim 13, wherein the electronic-circuit containing section contains a plurality of electronic circuit boards, to allow component mounting surfaces of the respective two electronic circuit boards to face to each other.

16. The cover unit as claimed in claim 14, wherein the electronic-circuit containing section contains a plurality of electronic circuit boards, to allow component mounting surfaces of the respective two electronic circuit boards to face to each other.

17. A cover unit for a fuel tank, comprising:

a cover section attached to the fuel tank to cover an opening of the fuel tank;

an electronic-circuit containing section that contains an electronic circuit;

an electric conductor attached to penetrate the cover section, and adapted to electrically connect the electronic circuit with an electrical equipment within the fuel tank; and a vapor passage formed between the cover section and the electronic-circuit containing section, and adapted to discharge fuel exuded from a gap between the cover section and the electric conductor, to outside of the fuel tank in a vapor state, wherein the cover unit is configured to have an annular spacer installed between a bottom surface of the electronic-circuit containing section and an upper surface of the cover section to place the electronic-circuit containing section apart from the upper surface of the cover section; and a bottom chamber is defined as a region surrounded by an inner wall surface of the spacer, the bottom surface of the electronic-circuit containing section, and the upper surface of the cover section, and wherein the vapor passage is defined by the bottom chamber.

18. The cover unit as claimed in claim 17, wherein the electronic-circuit containing section includes a communicating tube extending vertically from the bottom chamber to outside of the fuel tank; and the vapor passage is defined by the bottom chamber and a passage inside the communicating tube, and is isolated from a containment chamber of the electronic-circuit containing section.

19. The cover unit as claimed in claim 18, wherein a gas transmitting section to transmit gas and not to transmit liquid is attached in the vapor passage.

20. The cover unit as claimed in claim 18, wherein a sealing member is attached between the bottom surface of the electronic-circuit containing section and an upper surface of the cover section, to seal the bottom chamber

21. The cover unit as claimed in claim 19, wherein the electronic-circuit containing section contains a plurality of electronic circuit boards, to allow component mounting surfaces of the respective two electronic circuit boards to face to each other.

22. The cover unit as claimed in claim 20, wherein the electronic-circuit containing section contains a plurality of electronic circuit boards, to allow component mounting surfaces of the respective two electronic circuit boards to face to each other.

23. The cover unit as claimed in claim 17, wherein the electronic-circuit containing section includes a first through-hole to allow the bottom chamber, to communicate with a containment chamber inside the electronic-circuit containing section; and the electronic-circuit containing section further includes a second through-hole to allow the containment chamber to communicate with outside of the fuel tank.

24. The cover unit as claimed in claim 23, wherein a gas transmitting section to transmit gas and not to transmit liquid is attached in the vapor passage.

25. The cover unit as claimed in claim 23, wherein a sealing member is attached between the bottom surface of the electronic-circuit containing section and an upper surface of the cover section, to seal the bottom chamber.

26. The cover unit as claimed in claim 24, wherein the electronic-circuit containing section contains a plurality of electronic circuit boards, to allow component mounting surfaces of the respective two electronic circuit boards to face to each other.

27. The cover unit as claimed in claim 25, wherein the electronic-circuit containing section contains a plurality of electronic circuit boards, to allow component mounting surfaces of the respective two electronic circuit boards to face to each other.

28. The cover unit as claimed in claim 17, wherein a through-hole is formed in the annular spacer, to allow the bottom chamber to communicate with outside of the fuel tank; and a shielding wall is formed to stop a flow of liquid between the bottom chamber and outside of the fuel tank.

29. The cover unit as claimed in claim 28, wherein a gas transmitting section to transmit gas and not to transmit liquid is attached in the vapor passage.

30. The cover unit as claimed in claim 28, wherein a sealing member is attached between the bottom surface of the electronic-circuit containing section and an upper surface of the cover section, to seal the bottom chamber.

31. The cover unit as claimed in claim 29, wherein the electronic-circuit containing section contains a plurality of electronic circuit boards, to allow component mounting surfaces of the respective two electronic circuit boards to face to each other.

32. The cover unit as claimed in claim 30, wherein the electronic-circuit containing section contains a plurality of electronic circuit boards, to allow component mounting surfaces of the respective two electronic circuit boards to face to each other.

33. A cover unit for a fuel tank, comprising:

a cover section attached to the fuel tank to cover an opening of the fuel tank;

an electronic-circuit containing section that contains an electronic circuit;

an electric conductor attached to penetrate the cover section, and adapted to electrically connect the electronic circuit with an electrical equipment within the fuel tank; and a space adapted to discharge fuel exuded from a gap between the cover section and the electric conductor, to outside of the fuel tank in a vapor state, wherein the space is formed on an intermediate point of a passageway through which the exuded fuel enters the electronic-circuit containing section.

* * * * *